US009436289B2

(12) United States Patent
Komori et al.

(10) Patent No.: US 9,436,289 B2
(45) Date of Patent: Sep. 6, 2016

(54) TRANSMITTING DEVICE, DISPLAY CONTROL DEVICE, CONTENT TRANSMITTING METHOD, RECORDING MEDIUM, AND PROGRAM

(71) Applicant: Sony Corporation, Minato-ku (JP)

(72) Inventors: Akihiro Komori, Tokyo (JP); Tomoaki Takemura, Tokyo (JP); Shinya Masunaga, Tokyo (JP); Nobuhiro Ozu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 124 days.

(21) Appl. No.: 14/345,804

(22) PCT Filed: Oct. 10, 2012

(86) PCT No.: PCT/JP2012/006486
§ 371 (c)(1),
(2) Date: Mar. 19, 2014

(87) PCT Pub. No.: WO2013/069205
PCT Pub. Date: May 16, 2013

(65) Prior Publication Data
US 2014/0218326 A1    Aug. 7, 2014

(30) Foreign Application Priority Data
Nov. 8, 2011    (JP) .................................. 2011-244633

(51) Int. Cl.
*G06F 3/01*    (2006.01)
*H04N 21/422*    (2011.01)
(Continued)

(52) U.S. Cl.
CPC ............... *G06F 3/017* (2013.01); *G06F 3/013* (2013.01); *G06F 3/038* (2013.01); *G06F 3/041* (2013.01);
(Continued)

(58) Field of Classification Search
CPC ........ G06F 3/013; G06F 3/017; G06F 3/041; G06F 3/038; G06F 3/0488; G06F 3/0482; G06F 3/04883; G06F 3/0486; G06F 3/1423; G06F 2203/0384; G06F 2203/041; G06F 2203/0382; G06F 1/1647; G06F 1/165; H04N 21/4126; H04N 21/42224; H04N 21/4728; H04N 2005/443; H04N 21/42208; H04N 21/4222; H04N 21/42209; H04M 2250/64; H04M 1/72527; G09G 2360/122
See application file for complete search history.

(56) References Cited

U.S. PATENT DOCUMENTS

2005/0093868 A1* 5/2005 Hinckley ...................... 345/502
2007/0124503 A1* 5/2007 Ramos .................... G06F 3/017
709/248

(Continued)

FOREIGN PATENT DOCUMENTS

EP    1 858 238 A2    11/2007
EP    2 299 699 A2    3/2011
(Continued)

OTHER PUBLICATIONS

Extended European Search Report issued May 29, 2015 in Patent Application No. 12848375.7.
(Continued)

*Primary Examiner* — Priyank Shah
(74) *Attorney, Agent, or Firm* — Oblon, McClelland, Maier & Neustadt, L.L.P

(57) ABSTRACT

An apparatus includes a transmitter configured to transmit content and a point of interest indicator to a second device. The content and the point of interest indicator are selected by a user of the first device using a single action. The point of interest indicator identifies a portion of the content to be highlighted by the second device.

20 Claims, 17 Drawing Sheets

(51) Int. Cl.

| | | |
|---|---|---|
| *H04N 21/4728* | (2011.01) | |
| *G06F 3/038* | (2013.01) | |
| *G06F 3/0482* | (2013.01) | |
| *G06F 3/0488* | (2013.01) | |
| *G06F 3/041* | (2006.01) | |
| *G06F 3/14* | (2006.01) | |

(52) U.S. Cl.
CPC ......... *G06F 3/0482* (2013.01); *G06F 3/04883* (2013.01); *H04N 21/42224* (2013.01); *H04N 21/4728* (2013.01); *G06F 3/1423* (2013.01); *G06F 2203/0382* (2013.01); *G06F 2203/0384* (2013.01); *G06F 2203/041* (2013.01)

(56) References Cited

U.S. PATENT DOCUMENTS

| | | | |
|---|---|---|---|
| 2007/0146347 A1* | 6/2007 | Rosenberg | G06F 3/04883 345/173 |
| 2007/0271525 A1 | 11/2007 | Han et al. | |
| 2009/0061841 A1 | 3/2009 | Chaudhri et al. | |
| 2009/0207146 A1* | 8/2009 | Shimasaki et al. | 345/173 |
| 2010/0064260 A1 | 3/2010 | Amano | |
| 2010/0149120 A1* | 6/2010 | Lee | H04N 5/4403 345/173 |
| 2010/0245680 A1 | 9/2010 | Tsukada et al. | |
| 2011/0061020 A1 | 3/2011 | Yoo et al. | |
| 2011/0109581 A1 | 5/2011 | Ozawa et al. | |
| 2011/0113371 A1* | 5/2011 | Parker et al. | 715/810 |
| 2011/0113380 A1* | 5/2011 | Sakalowsky | G06F 3/0482 715/841 |
| 2011/0267291 A1 | 11/2011 | Choi et al. | |
| 2012/0017147 A1* | 1/2012 | Mark | 715/702 |
| 2012/0081293 A1* | 4/2012 | Sirpal et al. | 345/169 |
| 2012/0081299 A1* | 4/2012 | Xiao | H04N 21/42224 345/173 |
| 2012/0084694 A1* | 4/2012 | Sirpal | G06F 1/1616 715/769 |
| 2012/0173977 A1* | 7/2012 | Walker | G06F 3/0485 715/716 |
| 2012/0182210 A1* | 7/2012 | Chan et al. | 345/156 |
| 2014/0101585 A1 | 4/2014 | Yoo et al. | |
| 2014/0229858 A1* | 8/2014 | Bleker | H04W 4/206 715/753 |

FOREIGN PATENT DOCUMENTS

| | | |
|---|---|---|
| JP | 2003-157288 A | 5/2003 |
| JP | 2003-223415 | 8/2003 |
| JP | 2005-004690 A | 1/2005 |
| JP | 2007-181153 A | 7/2007 |
| JP | 2009-284551 A | 12/2009 |
| JP | 2010-271774 A | 12/2010 |
| JP | 2011-108147 A | 6/2011 |
| WO | WO 2009/105486 A2 | 8/2009 |

OTHER PUBLICATIONS

International Search Report issued Jan. 15, 2013 in PCT/JP2012/006486.

Office Action issued Oct. 20, 2015 in Japanese Patent Application No. 2011-244633.

Office Action issued May 31, 2016 in Japanese Patent Application No. 2011-244633.

* cited by examiner

Fig. 6

| DATA | DATA TYPE | EXAMPLE |
|---|---|---|
| ID | INTEGER | 123 |
| TYPE | CHARACTER STRING | image |
| FILE NAME | CHARACTER STRING | image.jp |
| PLACE OF FILE NAME TAG FROM HEAD | INTEGER | 5 |
| RELATIVE POSITION OF POINT OF GAZE IN IMAGE IN HORIZONTAL DIRECTION | FLOATING-POINT NUMBER | 0.75 |
| RELATIVE POSITION OF POINT OF GAZE IN IMAGE IN VERTICAL DIRECTION | FLOATING-POINT NUMBER | 0.3 |

Fig. 7

| DATA | DATA TYPE | EXAMPLE | OPTION |
|---|---|---|---|
| ID | INTEGER | 123 | |
| TYPE | CHARACTER STRING | video | |
| FILE NAME | CHARACTER STRING | movie.mpg | |
| PLACE OF FILE NAME TAG FROM HEAD | INTEGER | 5 | |
| RELATIVE POSITION OF POINT OF GAZE IN IMAGE IN HORIZONTAL DIRECTION | FLOATING-POINT NUMBER | 0.75 | |
| RELATIVE POSITION OF POINT OF GAZE IN IMAGE IN VERTICAL DIRECTION | FLOATING-POINT NUMBER | 0.3 | |
| MEDIA TIME AT WHICH SETTING OF POINT OF GAZE STARTS | FLOATING-POINT NUMBER | 90.0 | ○ |
| MEDIA TIME AT WHICH SETTING OF POINT OF GAZE ENDS | FLOATING-POINT NUMBER | 100.0 | ○ |

| DATA | DATA TYPE | EXAMPLE |
|---|---|---|
| ID | INTEGER | 123 |
| TYPE | CHARACTER STRING | text |
| CHARACTER STRING INCLUDED IN POINT OF GAZE AND POINTS BEFORE AND AFTER POINT OF GAZE | CHARACTER STRING | NOTEBOOK COMPUTER |
| PLACE OF CHARACTER STRING FROM HEAD | INTEGER | 3 |
| POSITION IN CHARACTER STRING | INTEGER | 5 |

Fig. 17
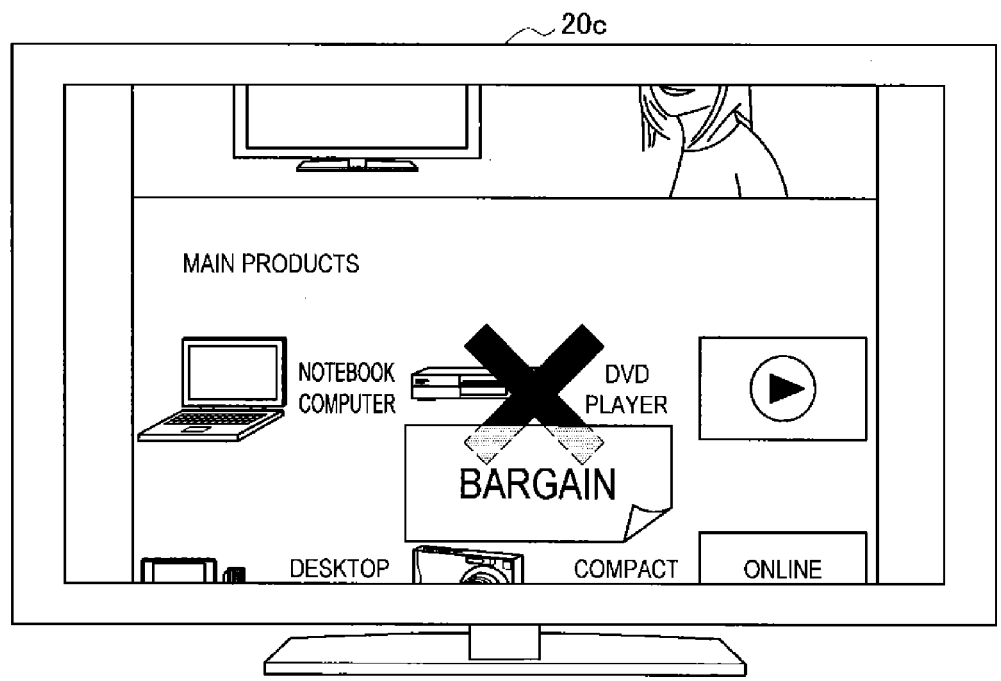
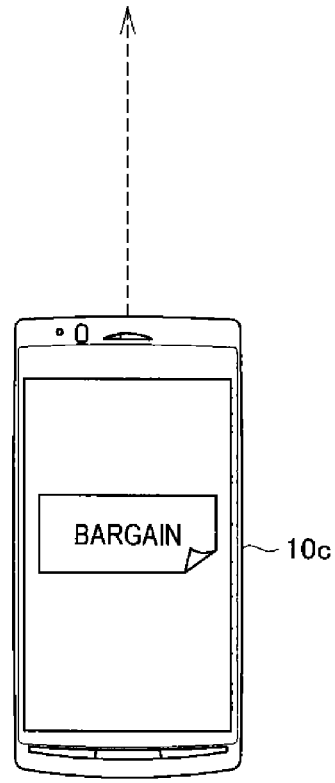

TRANSMITTING DEVICE, DISPLAY CONTROL DEVICE, CONTENT TRANSMITTING METHOD, RECORDING MEDIUM, AND PROGRAM

CROSS-REFERENCE TO RELATED APPLICATIONS

The present application is based upon and claims the benefit of priority under 35 U.S.C. 119 of Japanese Priority Patent Application JP 2011-244633 filed in the Japanese Patent Office on Nov. 8, 2011, the entire contents of which are hereby incorporated by reference.

TECHNICAL FIELD

The present disclosure relates to a transmitting device, a display control device, a content transmitting method, a recording medium, and a program encoded on a non-transitory computer readable medium.

BACKGROUND ART

Recently, with the advancement of network-related technology, content has been actively shared. The content or a storage address of the content is transmitted so that a viewing experience of the content can be shared between a plurality of devices. For example, Patent Literature 1 discloses technology for displaying an image displayed by a small secondary display by a large primary display, using a "slow" operation.

CITATION LIST

Patent Literature

PTL 1: JP 2005-004690A

SUMMARY

Technical Problem

As such, in a situation in which the content is generally shared, it is necessary to share not only an original content but also information regarding a point of interest in the content. Accordingly, it is desirable to provide a transmitting device, a display control device, a content transmitting method, a recording medium, and a program that enable sharing of information regarding a point of interest in content.

Solution to Problem

In one embodiment, the present invention includes an apparatus that includes a transmitter configured to transmit content and a point of interest indicator to a second device. The content and the point of interest indicator are selected by a user of the first device using a single action. The point of interest indicator identifies a portion of the content to be highlighted by the second device.

Advantageous Effects of Invention

According to the embodiments of the present disclosure described above, information regarding a point of interest in content can be shared.

BRIEF DESCRIPTION OF DRAWINGS

FIG. 6 is a diagram illustrating an example of point of interest information when a point of interest is designated on a still image object in HTML content, in the transmitting device according to the first embodiment.

FIG. 7 is a diagram illustrating an example of point of interest information when a point of interest is designated on a moving image object in HTML content, in the transmitting device according to the first embodiment.

FIG. 17 is a diagram illustrating an example of additional information that is transmitted by the transmitting device according to the third embodiment.

DESCRIPTION OF EMBODIMENTS

Figure 1:
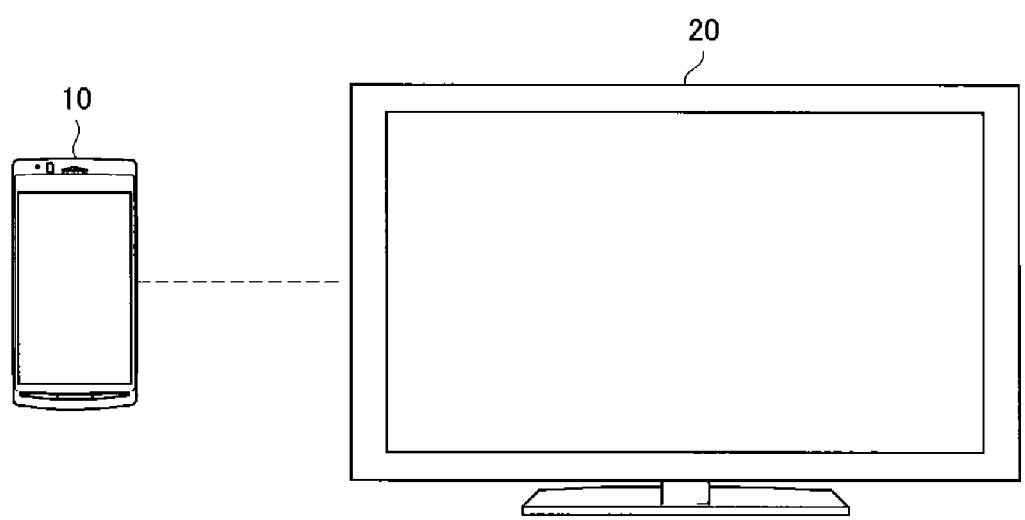
FIG. 1 is a diagram illustrating an example of a configuration of a content sharing system according to first to third embodiments of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.

Figure 2:
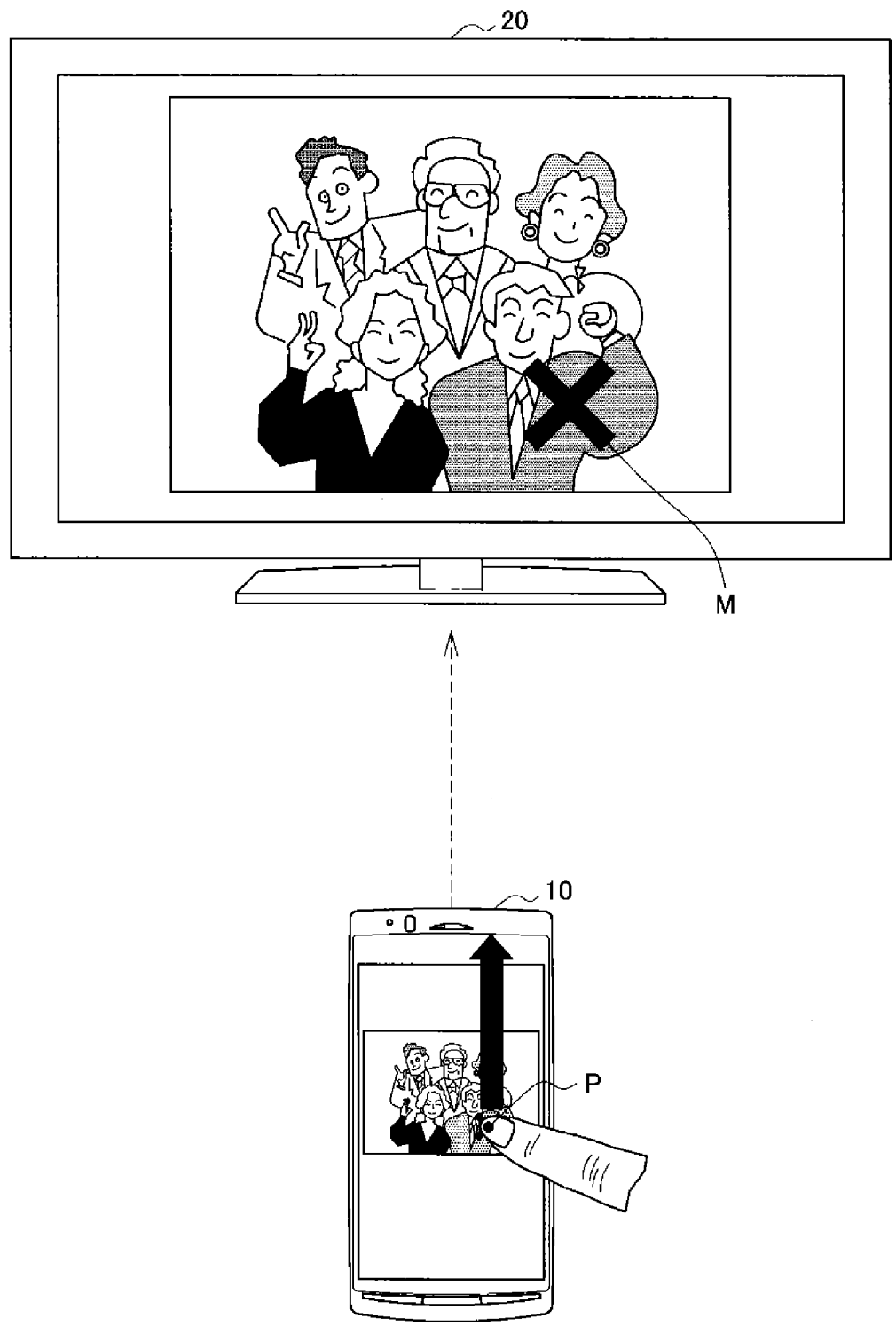
FIG. 2 is a diagram illustrating an outline of the content sharing system according to the embodiments.

1. Outline
2. First Embodiment
2-1. Functional Configuration of Transmitting Device
2-2. Point of interest Information
2-3. Functional Configuration of Reproducing Device
3. Second Embodiment
4. Third Embodiment
5. Fourth Embodiment 1. Outline First, an outline of a content sharing system according to first to third embodiments of the present disclosure will be described with reference to FIGS. 1 and 2. FIG. 1 is a diagram illustrating an example of a configuration of the content sharing system according to the first to third embodiments of the present disclosure. FIG. 2 is a diagram illustrating the outline of the content sharing system according to the embodiments.

Hereinafter, the content sharing system according to the first to third embodiments of the present disclosure may be called a content sharing system according to an embodiment of the present disclosure.

Referring to FIG. 1, a content sharing system 1 according to an embodiment of the present disclosure mainly includes a transmitting device 10 and a reproducing device 20. The transmitting device 10 is an information processing device that has a function of transmitting content, in the content sharing system 1. The reproducing device 20 is an information processing device that has a function of receiving content and reproducing the content, in the content sharing system 1. The transmitting device 10 and the reproducing device 20 are connected to each other through a network.

The transmitting device 10 and the reproducing device 20 may be information processing devices, such as personal computers (PC), domestic video processing devices (such as DVD recorders and video cassette recorders), personal digital assistants (PDA), domestic game machines, and home appliances. The transmitting device 10 and the reproducing device 20 may be information processing devices, such as mobile phones, personal handyphone systems (PHS), portable music reproducing devices, portable video processing devices, portable game machines, and portable navigation devices. In this case, an example of the case in which the transmitting device 10 is a mobile phone and the reproducing device 20 is a television receiver will be described.

Next, referring to FIG. 2, in a state in which content transmitted in the transmitting device 10 is displayed, a user can designate a point P of interest in the content. At this time, the transmitting device 10 generates point of interest information to specify the designated point P of interest. If the user performs a content transmission operation, the transmitting device 10 can transmit the content and the point of interest information. The reproducing device 20 that has received the content and the point of interest information reproduces the received content and point of interest information. For example, the reproducing device 20 can display a mark M showing the point of interest, on the basis of the point of interest information.

As such, the present disclosure suggests a mechanism for sharing the point of interest in the content between the transmission side and the reception side. The user of the transmission side can share the point of interest in the content with a user of the reception side as if the user of the transmission side has drawn a circle on a map printed on paper using a red pen and has delivered the paper to the user of the reception side.

For example, if the user performs an editing operation for editing the substance of the content or inserting the content into a different document and adding explanatory note data, the user can share the point of interest with another user. However, the present disclosure suggests a content sharing system that enables sharing of the point of interest with a simpler operation. In addition, the present disclosure suggests a mechanism for sharing the point of interest appropriately, even when screen resolutions of the transmission side and the reception side are different from each other or when the layout is changed by a drawing environment of each of the transmission side and the reception side.

In the present disclosure and drawings, a plurality of structural elements having substantially the same functional configurations may be distinguished by adding different alphabets to the backs of the same reference numerals. For example, a plurality of structural elements having substantially the same functional configurations are distinguished like a content sharing system 1a and a content sharing system 1b, if necessary. However, when it is not necessary to distinguish the plurality of structural elements having substantially the same functional configurations in particular, the plurality of structural elements are denoted with only the same reference numerals. For example, when it is not necessary to distinguish the content sharing system 1a and the content sharing system 1b in particular, the content sharing system 1a and the content sharing system 1b are simply called the content sharing systems 1. In the description below, the content distributing systems are distinguished as follows. The content sharing systems are distinguished such that the content sharing system 1a is used when the first embodiment is described and the content sharing system 1b is used when the second embodiment is described.

2. First Embodiment 2-1. Functional Configuration of Transmitting Device

Figure 3:
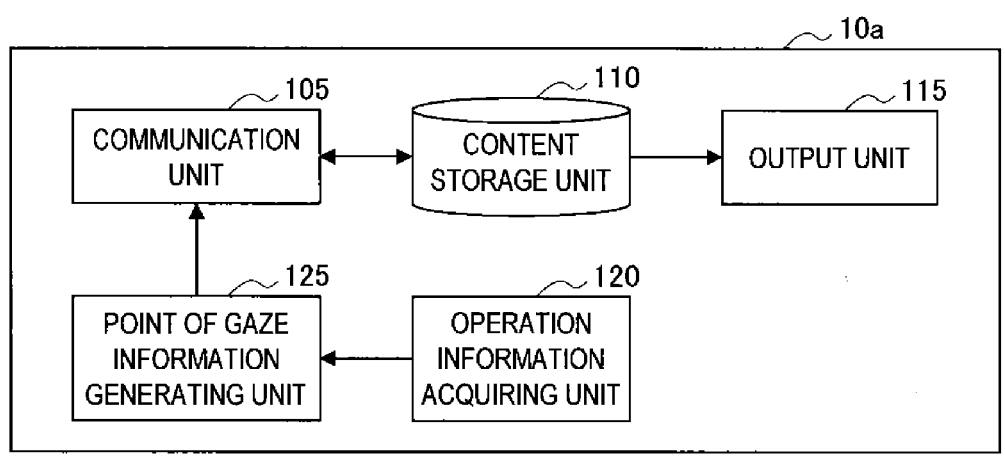
FIG. 3 is a block diagram illustrating a functional configuration of a transmitting device according to a first embodiment.
Figure 4:
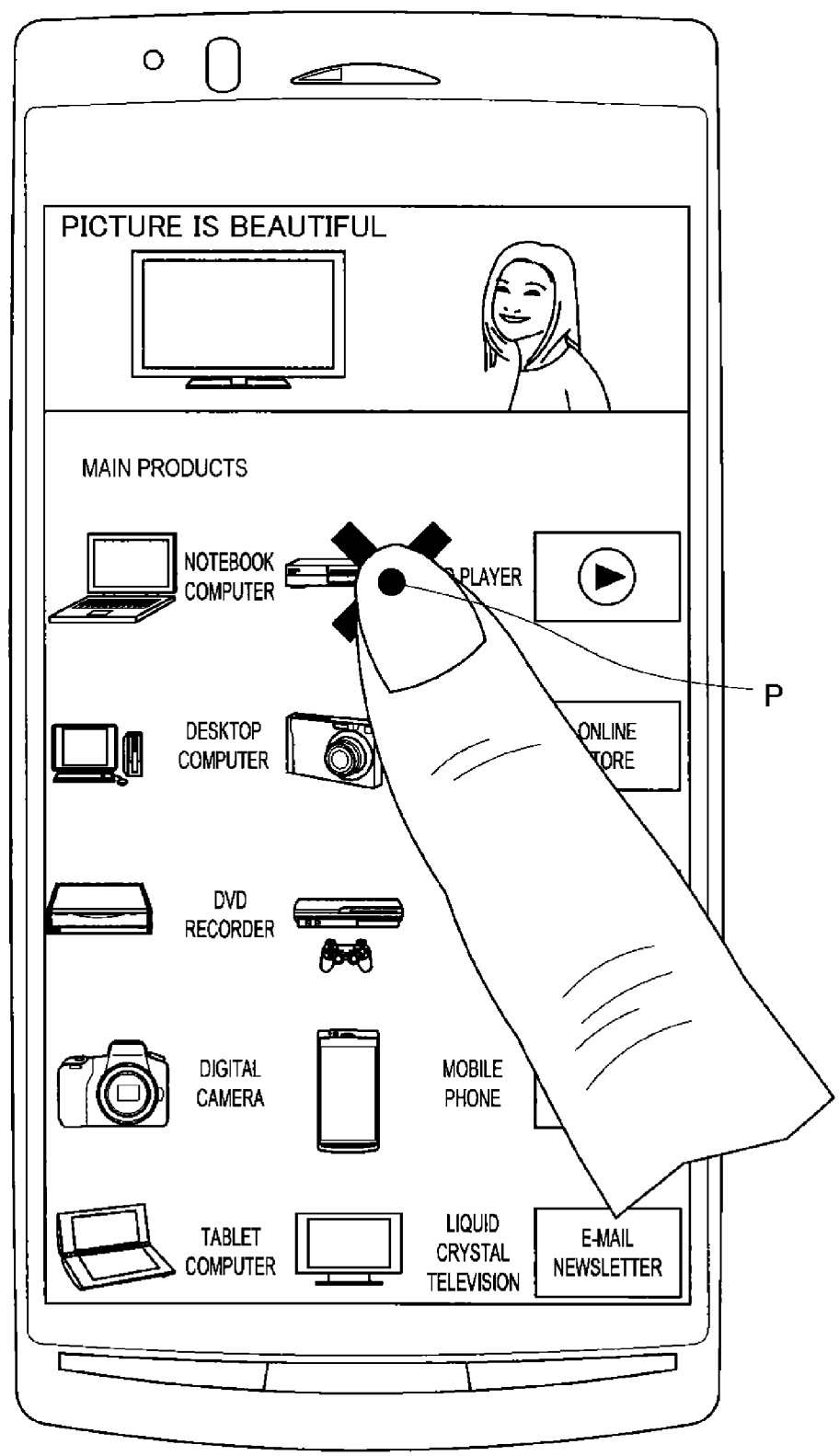
FIG. 4 is a diagram illustrating an example of a point of interest designation operation of the transmitting device according to the first embodiment.
Figure 5:
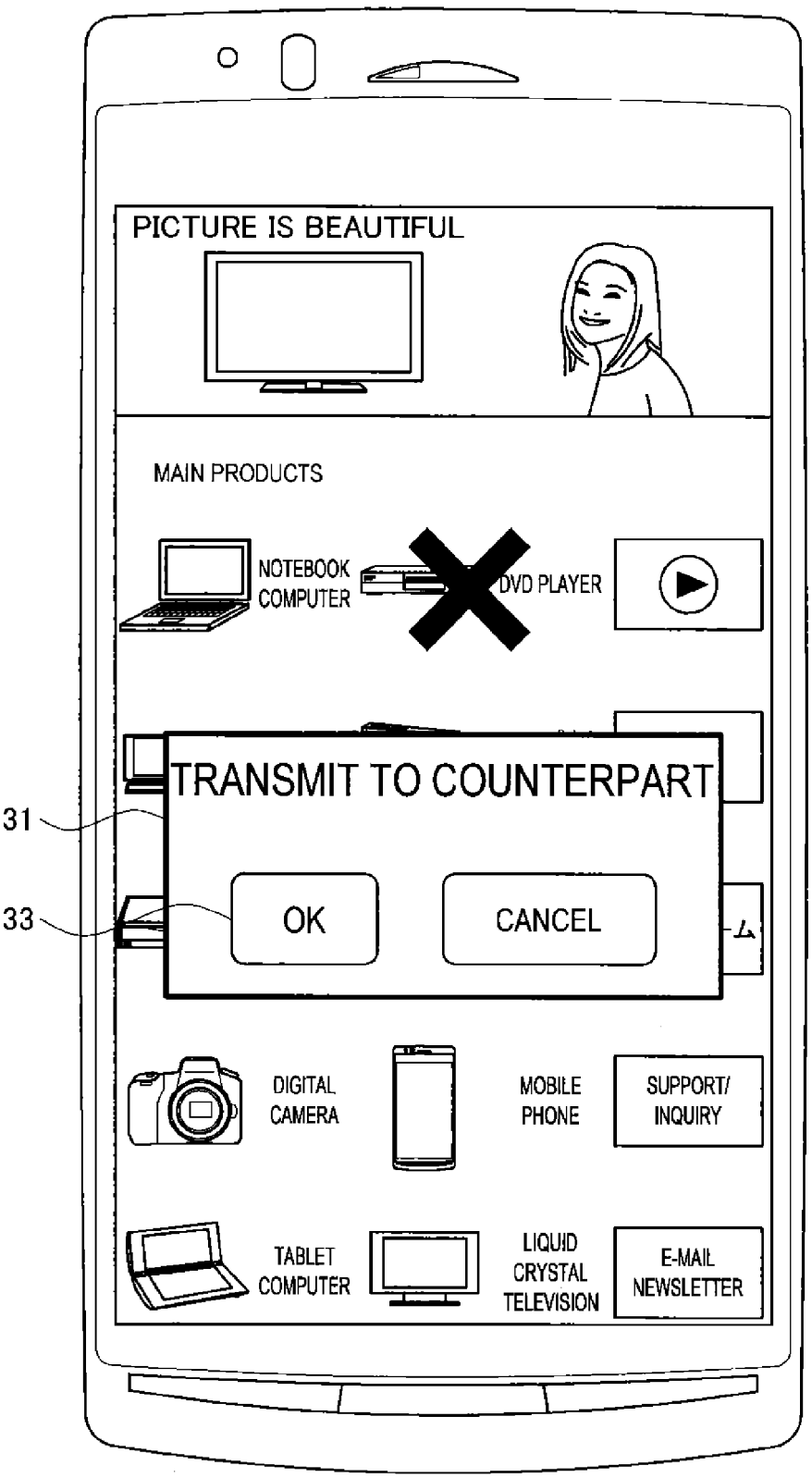
FIG. 5 is a diagram illustrating an example of a transmission operation of the transmitting device according to the first embodiment.

First, a functional configuration of a transmitting device 10a according to the first embodiment of the present disclosure will be described with reference to FIGS. 3 to 5. FIG. 3 is a block diagram illustrating the functional configuration of the transmitting device according to the first embodiment. FIG. 4 is a diagram illustrating an example of a point of interest designation operation of the transmitting device according to the first embodiment. FIG. 5 is a diagram illustrating an example of a transmission operation of the transmitting device according to the first embodiment.

The transmitting device 10a according to the first embodiment of the present disclosure mainly includes a communication unit 105, a content storage unit 110, an output unit 115, an operation information acquiring unit 120, and a point of interest information generating unit 125.

(Communication Unit 105a)

The communication unit 105a is a communication device for connection with the network. For example, the communication unit 105a is a wired or wireless LAN, Bluetooth (registered trademark), a communication card for a WUSB, a router for optical communication, a router for an ADSL, or a modem for various communications. The network that is connected to the communication unit 105a is composed of a network connected by wire or wireless. For example, the network is the Internet, a domestic LAN, infrared communication, visible light communication, broadcasting, or satellite communication. In this case, the LAN is an abbreviation of a local area network. The WUSB is an abbreviation of a wireless USB. The ADSL is an abbreviation of an asymmetric digital subscriber line.

The communication unit 105a is a connection interface for connection with the reproducing device 20a through a home network. The communication unit 105a can function as a transmitting unit that transmits content associated with the point of interest information and the point of interest information to the reproducing device 20a, when the communication unit 105a receives the point of interest information generated by the point of interest information generating unit 125. The communication unit 105a may transmit information to acquire the content, for example, a storage address to specify a storage place of the content, instead of transmitting the content. For example, the communication unit 105a can transmit the point of interest information and a uniform resource locator (URL) where the content provided with the point of interest is stored, to the reproducing device 20a.

(Content Storage Unit 110)

The content storage unit 110 is a data storage device that stores content data and examples of the content storage unit 110 may include a storage medium, a recording device recording data in the storage medium, a reading device reading data from the storage medium, and an erasing device erasing the data recorded in the storage medium. In this case, a non-volatile memory such as a flash memory, a magnetoresistive random access memory (MRAM), a ferroelectric random access memory (FeRAM), a phase change random access memory (PRAM), and an electronically erasable and programmable read only memory (EEPROM) and a magnetic recording medium such as a hard disk drive (HDD) may be used as the storage medium.

The content storage unit 110 can store the content. In this case, the content is a concept that includes image data such as photos, documents, pictures, and charts, audio data such as HTML files, music, lectures, and radio programs, movies, television programs, and video programs. The content storage unit 110 can store the content that is acquired through the communication unit 105a. The content storage unit 110 can store the content that is generated by an imaging unit not illustrated in the drawings. The content storage unit 110 can store the content downloaded from a removable disk not illustrated in the drawings to the transmitting device 10.

(Output Unit 115)

The output unit 115 has a function of outputting information to the user. The output unit 115 may be a display unit that outputs a display screen. The output unit 115 may have a function of a voice output unit.

(Operation Information Acquiring Unit 120)

The operation information acquiring unit 120 has a function of acquiring operation information input from the outside. In this case, the acquired operation information may be operation information regarding a designation operation of the point of interest or operation information regarding a transmission operation of the content. For example, referring to FIG. 4, an example of the designation operation of the point of interest is illustrated. For example, the designation of the point of interest may be performed by designating a position on a display screen in which touch sensors overlap. Referring to FIG. 5, an example of a transmission operation for transmitting content and point of interest information to the reproducing device 20 is illustrated. For example, the transmission operation may be made by operating a transmission decision button 33 in a confirmation window displayed when a finger to designate the point of interest is separated from the screen. However, the operation used in the above case may be exemplary and a variety of different operations may be used. For example, as illustrated in FIG. 2, the transmission operation may be a flick operation from a designated position of the point of interest. Alternatively, the operation information acquiring unit 120 may have a function of a detecting unit that detects the inclination of the transmitting device 10a and the transmission operation may be an operation for inclining a casing. The operation information acquiring unit 120 can supply the acquired operation information to the point of interest information generating unit 125. In another embodiment, the operation information acquiring unit 120 may detect a direction of a face of a user and select the content and the point of interest based on the direction detected.

(Point of Interest Information Generating Unit 125)

The point of interest information generating unit 125 has a function of generating point of interest information showing a position of a point of interest in the content. If a specific point P is designated on the content, the point of interest information generating unit 125 can generate point of interest information in which the specific position is set as the position of the point of interest. For example, as illustrated in FIG. 2, when the content is an image content to be one image, the point of interest information generating unit 125 may generate point of interest information showing the position of the point of interest by a relative position of the point of interest in the image content. For example, when a plurality of objects are included in content, like HTML content illustrated in FIG. 4, point of interest information can include information to specify an object displayed at the position of the point of interest. The information to specify the object may be, for example, a file name of the object. In order to cope with a situation in which there are a plurality of objects having the same file names, the information to specify an object may include information showing a place from the top in the order of objects having the same file names. The point of interest information may further include information showing a relative position of the point of interest in an image object, when an object displayed at the position of the point of interest is the image object. The point of interest information that is generated by the point of interest information generating unit 125 will be described in detail below.

2-2. Point of Interest Information

Figures 8, 9:
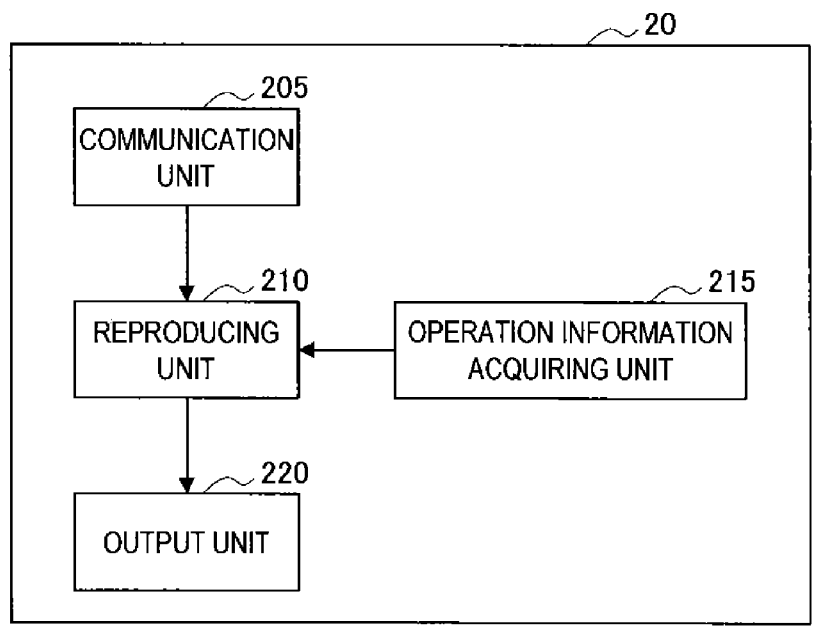
FIG. 8 is a diagram illustrating an example of point of interest information when a point of interest is designated on a text object in HTML content, in the transmitting device according to the first embodiment.
FIG. 9 is a block diagram illustrating a functional configuration of a reproducing device according to the first embodiment.

Next, the point of interest information that is generated by the transmitting device 10a according to the first embodiment and is transmitted to the reproducing device 20 will be described in detail with reference to FIGS. 6 to 8. FIG. 6 is a diagram illustrating an example of point of interest information when a point of interest is designated on a still image object in HTML content, in the transmitting device according to the first embodiment. FIG. 7 is a diagram illustrating an example of point of interest information when a point of interest is designated on a moving image object in HTML content, in the transmitting device according to the first embodiment. FIG. 8 is a diagram illustrating an example of point of interest information when a point of interest is designated on a text object in HTML content, in the transmitting device according to the embodiment.

As described above, in content such as the HTML content in which a plurality of objects are arranged to be included, an arrangement of the objects may be different according to an environment of a display device to display the content. In this case, if the user desires to specify the position of the point of interest by the relative position when the content is displayed in the transmitting device 10*a*, a desired position may not be shown. Therefore, the present disclosure suggests a format of point of interest information to securely transmit a position of a point of interest desired by the user to the reproducing device 20, even when the arrangement of the objects is different according to the environment of the display device.

In order to securely transmit the position of the point of interest in a situation in which the arrangement of the objects in the content may be different according to environments of a transmission-side device and a reception-side device, the transmitting device 10*a* can generate point of interest information showing a position of a point of interest by information to specify an object and information to specify the position of the point of interest in the object. The HTML content can include objects such as text data, a still image file, and a moving image file. Therefore, the point of interest information generating unit 125 can first generate the information to specify the object displayed at the point of interest designated by the user. If the objects can be specified, the reproducing device 20 can recognize that the point of interest is designated on the specified object, even when the arrangement of the objects changes. When the objects are specified, the object file names may be used. However, when there are a plurality of objects having the same file names in the same content, the objects may not be specified by only the file names. For this reason, when specifying an object, its place in the order of objects in the content may be used. For example, when there are a plurality of objects having the same file names "image.jpg", the object can be specified by information showing what number "image.jpg" it is. When the object is text data, a character string of the text data may be used when the object is specified. For example, when the object is text data displayed as a "notebook computer", the character string "notebook computer" can be used when the object is specified.

When the object is sufficiently small, the position of the point of interest can be specified with sufficient precision only by specifying the object. However, the detailed position of the point of interest can be shown by further specifying the position of the point of interest in the object. Therefore, the point of interest information can include information regarding the position of the point of interest in the object. For example, when the object is an image object, the position of the point of interest in the object may be shown by the relative position in the image. When the object is a text object, the position of the point of interest in the object may be shown by the number of characters from a head of a character string. For example, when a position of a character of "b" in the "notebook computer" is set as the point of interest, a position "5" from a head of a character string can be used as information showing the position of the point of interest in the object, because "b" is a fifth character in the "notebook computer". Hereinafter, an example of point of interest information for each type of the objects will be described in detail.

First, referring to FIG. 6, an example of point of interest information when a point of interest is designated on a still image object in HTML content is illustrated. In this case, the point of interest information can include an ID, a type, a file name, a place of a file name tag from the top, a relative position of a point of interest in an image in a horizontal direction, and a relative position of a point of interest in an image in a vertical direction. The ID is identification information used to identify a point of interest and a data type thereof may be an integer type. The type shows a type of each object and a data type thereof may be a character string type. The file name shows a file name of each object and a data type thereof may be a character string type. The place of the file name tag from the top is information used to specify each object when there are a plurality of objects having the same file names in content and shows a place from the top in the content. A data type of a place of the file name tag from the top may be an integer type. The relative position of the point of interest in the image in the horizontal direction and the relative position of the point of interest in the image in the vertical direction are information used to specify the detailed position of the point of interest in the specified object and data types thereof may be floating-point number types.

When the still image object is displayed on a place of the point of interest designated by the user, the point of interest information generating unit 125 can generate point of interest information including the information described above. For example, a point of interest control command may be represented by the following character string.

"poi={id:'123',type:'image',file:'image.jpg',tag_index: '5',position_x:'0.75',position_y:'0.3'}"

Next, referring to FIG. 7, an example of point of interest information when a point of interest is designated on a moving image object in HTML content is illustrated. In this case, the point of interest information can include an ID, a type, a file name, a place of a file name tag from the top, a relative position of a point of interest in an image in a horizontal direction, a relative position of a point of interest in an image in a vertical direction, a media time at which setting of the point of interest starts, and a media time at which the setting of the point of interest ends. That is, as compared with the case of the still image object, the media time at which the setting of the point of interest starts and the media time at which the setting of the point of interest ends may be further included. The media time at which the setting of the point of interest starts and the media time at which the setting of the point of interest ends are information used to specify a setting period of the point of interest in the moving image object and data types thereof may be floating-point number types. In the example of FIG. 7, the start end and the end time are specified by ratios from the head. In this case, a unit is a percentage. With respect to the moving image object, a position of a point of interest that changes in time series may be designated. At this time, point of interest information is generated from the trace of the position designated by the user.

When the moving image object is displayed on a place of the point of interest designated by the user, the point of interest information generating unit 125 can generate point of interest information including the information described above. For example, a point of interest control command may be represented by the following character string.

"poi={id:'123',type:'video',file:'movie.mpg',tag_index: '5',position_x:'0.75',position_y:'0.3',start_time:'90.0', end_time:'100.0'}"

Next, referring to FIG. 8, an example of point of interest information when a point of interest is designated on a text object in HTML content is illustrated. In this case, the point of interest information can include an ID, a type, a character string included in a point of interest and points before and after the point of interest, a place of a character string from the top, and a position in the character string. The ID is identification information used to identify the point of interest and a data type thereof may be an integer type. The type shows a type of each object and a data type thereof may be a character string type. The character string included in the point of interest and the points before and after the point of interest shows a character string that is displayed in the vicinity of the position of the point of interest. The place of the character string from the top is used to specify each character string when there are a plurality of character strings equal to each other in the same content. In the example of FIG. 8, the place of the character string from the top is information showing what number "notebook computer" it is. The position in the character string is information showing what number character in the character string the position of the point of interest in the character string is and a data type thereof may be an integer type. In the example of FIG. 8, because the position in the character string shows the fifth character in the "notebook computer", the position of "b" is the point of interest.

When the text object is displayed on a place of the point of interest designated by the user, the point of interest information generating unit 125 can generate point of interest information including the information described above. For example, a point of interest control command may be represented by the following character string.

"poi={id:'123',type:'text',str:'notebook computer',tag_index:'3',position:'5'}"

2-3. Functional Configuration of Reproducing Device

Figure 10:
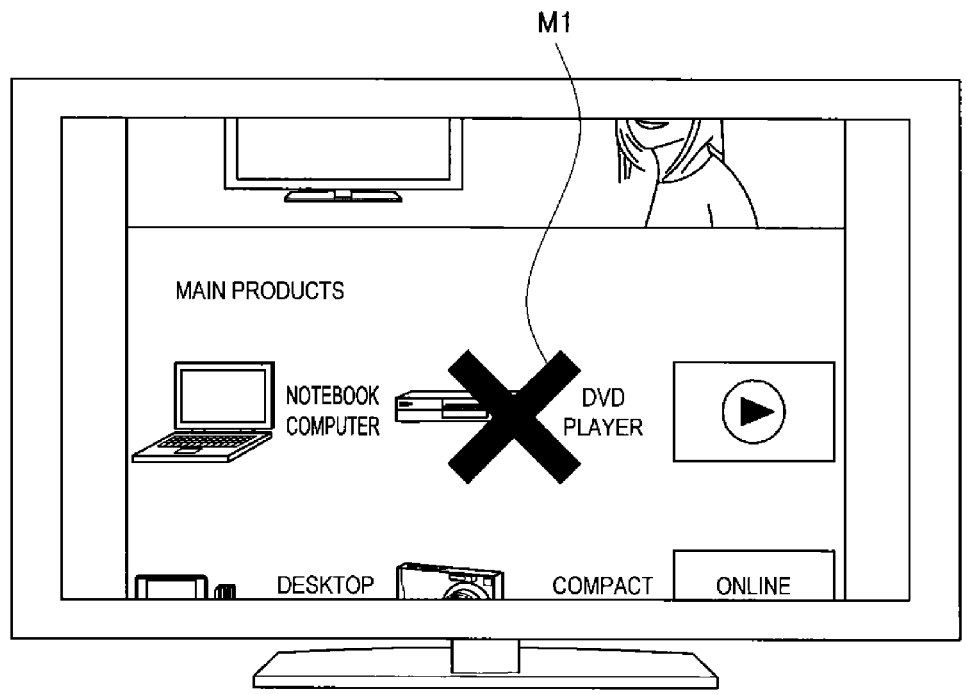
FIG. 10 is a diagram illustrating an example of a point of interest that is displayed by the reproducing device according to the first embodiment.
Figure 11:
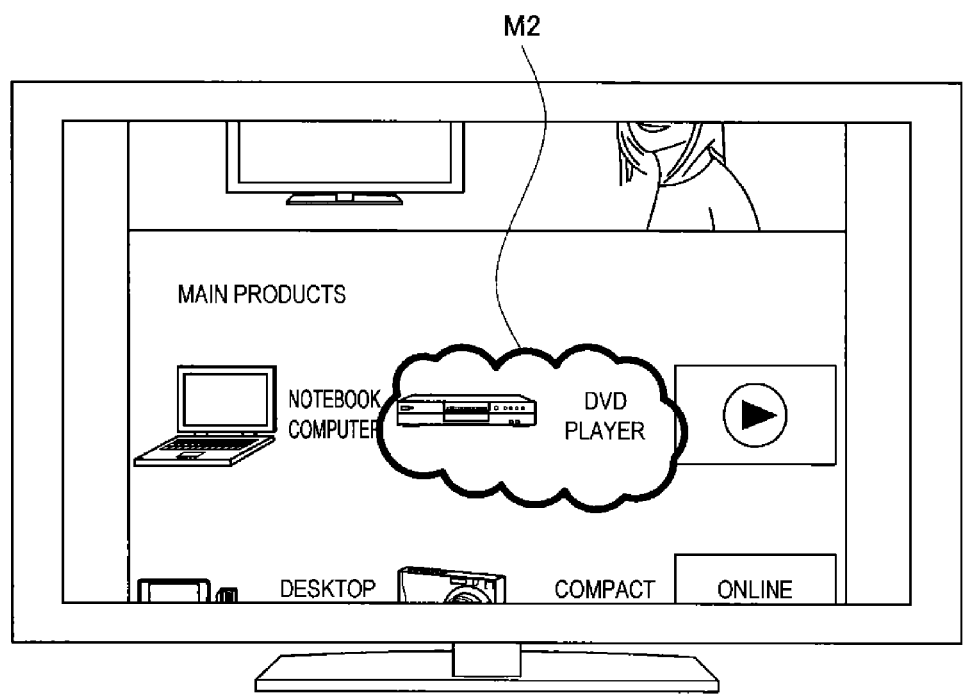
FIG. 11 is a diagram illustrating another example of the point of interest that is displayed by the reproducing device according to the first embodiment.
Figure 12:
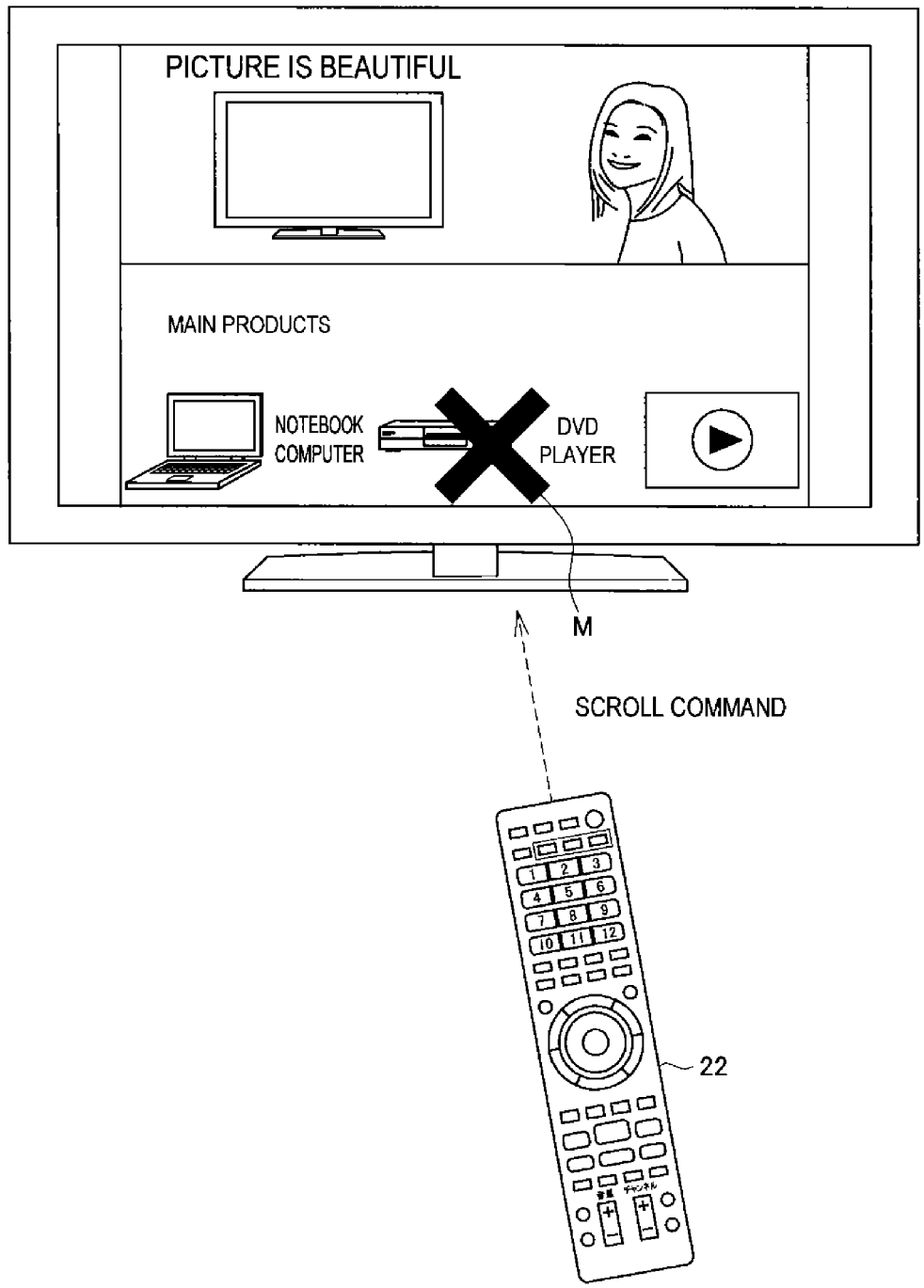
FIG. 12 is a diagram illustrating an operation of the reproducing device according to the first embodiment, when a scroll operation is performed.
Figure 13:
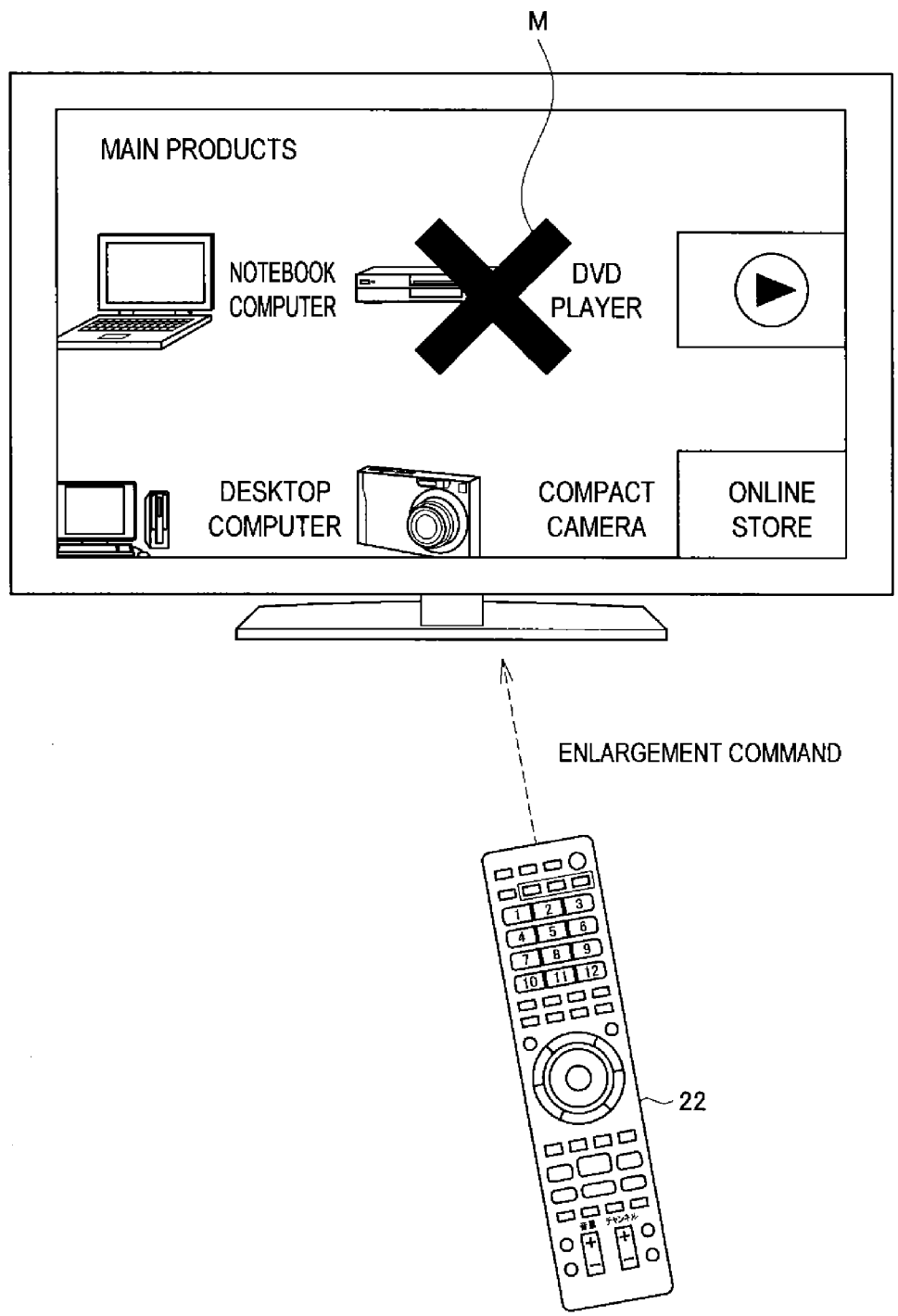
FIG. 13 is a diagram illustrating an operation of the reproducing device according to the first embodiment, when an enlargement operation is performed.

Next, a functional configuration of the reproducing device according to the first embodiment will be described with reference to FIGS. 9 to 13. FIG. 9 is a block diagram illustrating the functional configuration of the reproducing device according to the first embodiment. FIG. 10 is a diagram illustrating an example of a point of interest that is displayed by the reproducing device according to the first embodiment. FIG. 11 is a diagram illustrating another example of the point of interest that is displayed by the reproducing device according to the first embodiment. FIG. 12 is a diagram illustrating an operation of the reproducing device according to the first embodiment, when a scroll operation is performed. FIG. 13 is a diagram illustrating an operation of the reproducing device according to the first embodiment, when an enlargement operation is performed.

The reproducing device 20 mainly includes a communication unit 205, a reproducing unit 210, an operation information acquiring unit 215, and an output unit 220. The reproducing device 20 is an example of a display control device that provides content and a point of interest to the user.

(Communication Unit 205)

The communication unit 205 is a communication device for connection with the network. For example, the communication unit 205 is a wired or wireless LAN, Bluetooth (registered trademark), a communication card for a WUSB, a router for optical communication, a router for an ADSL, or a modem for various communications. The network that is connected to the communication unit 205 is composed of a network connected by wire or wireless. For example, the network is the Internet, a domestic LAN, infrared communication, visible light communication, broadcasting, or satellite communication. In this case, the LAN is an abbreviation of a local area network. The WUSB is an abbreviation of a wireless USB. The ADSL is an abbreviation of an asymmetric digital subscriber line.

In this case, the communication unit 205 is a connection interface for connection with the transmitting device 10 through a home network. The communication unit 205 can receive content or information (for example, URL) to identify the content, from the transmitting device 10. The communication unit 205 can receive point of interest information showing a position of a point of interest in the content, from the transmitting device 10. The communication unit 205 can receive the content, on the basis of the information to acquire the content. For example, when the URL of the content is received, the communication unit 205 can have access to the URL and acquire the content.

(Reproducing Unit 210)

The reproducing unit 210 has a function of reproducing content. The reproducing unit 210 is an example of a display control unit that controls display of the output unit 220 functioning as a display unit. For example, the reproducing unit 210 can reproduce the received content and the point of interest. For example, as illustrated in FIG. 10, the reproducing unit 210 can reproduce the point of interest by overlapping a mark M1 showing the point of interest to the HTML content. The reproducing unit 210 can reproduce the content and the point of interest, such that the center of the mark M1 becomes the position of the point of interest. When the point of interest is shown, exactly, when the user desires to show a specific point, the mark M1 illustrated in FIG. 10 may be used. Alternatively, when the user desires to show a rough position of the point of interest, a mark M2 illustrated in FIG. 11 may be used. At this time, the reproducing unit 210 may display the mark M2, such that the center of gravity of the mark M2 becomes the point of the point of interest. The reproducing unit 210 can provide the reproduced content and point of interest to the user by the output unit 220.

The reproducing unit 210 preferably reproduces the content, such that the point of interest in the content is displayed on a display screen. For example, in the case of the HTML content, the entire content may not be displayed on the display screen at one time and a display region is scrolled by a scroll operation in general. In normal cases, when the reproducing of the content starts, the HTML content is reproduced such that an upper end of the HTML content overlaps an upper end of the display region. However, when the point of interest is not included in the display region, it is difficult for the user of the reception side to recognize that the content and the point of interest have been transmitted. Therefore, the reproducing unit 210 can control the display region, such that the point of interest is included in the display region. At this time, if the content is reproduced such that the point of interest becomes approximately the center of the screen, the user can easily recognize the point of interest. When a plurality of points of interest are included in the content, the content may be reproduced such that the display region includes all of the points of interest or includes as many points of interest as possible.

The reproducing unit 210 can change a reproduction state, on the basis of operation information supplied from the operation information acquiring unit 215. For example, as illustrated in FIG. 12, the reproducing unit 210 can scroll the display region of the content, on the basis of operation information input by a remote controller 22. At this time, the reproducing unit 210 can change the position of the mark M, such that the mark M showing the point of interest overlaps the object shown by the point of interest. In this example, the point of interest is designated on an image of a DVD player.

The point of interest information includes the information to specify the image object. For this reason, even when the arrangement of the image object changes, the mark M can be displayed on the image object, according to the change in the arrangement of the image object. Likewise, as illustrated in FIG. 13, the reproducing unit 210 can enlarge or reduce content and display the content, on the basis of operation information input by the remote controller 22. Even in this case, the reproducing unit 210 can change the position of the mark M, such that the mark showing the point of interest overlaps the same object.

(Operation Information Acquiring Unit 215)

The operation information acquiring unit 215 has a function of acquiring an input signal that is generated when the user performs a desired operation using an operation unit. The operation unit may be a touch panel, a mouse, a keyboard, a button, a microphone, a switch, a lever, and various sensors (for example, inclination detecting sensor). In this embodiment, the operation information acquiring unit 215 can acquire the operation information from the remote controller 22. The reproducing device 20 can operate on the basis of the operation information acquired by the operation information acquiring unit 215.

(Output Unit 220)

The output unit 220 has a function of outputting information to the user. The output unit 220 may be a display unit that outputs a display screen. The output unit 220 can output a display screen, according to control from the reproducing unit 210 functioning as a display control unit. The output unit 220 may have a function of a voice output unit. The output unit 220 can output the content and the point of interest reproduced by the reproducing unit 210.

3. Second Embodiment

Figure 14:
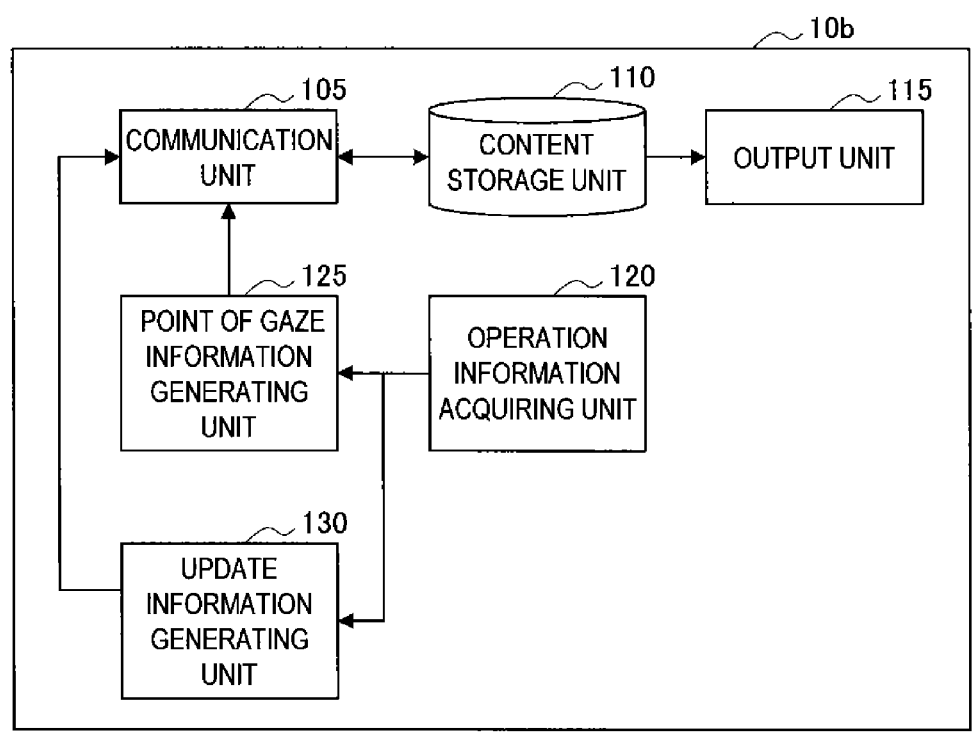
FIG. 14 is a block diagram illustrating a functional configuration of a transmitting device according to a second embodiment of the present disclosure.
Figure 15:
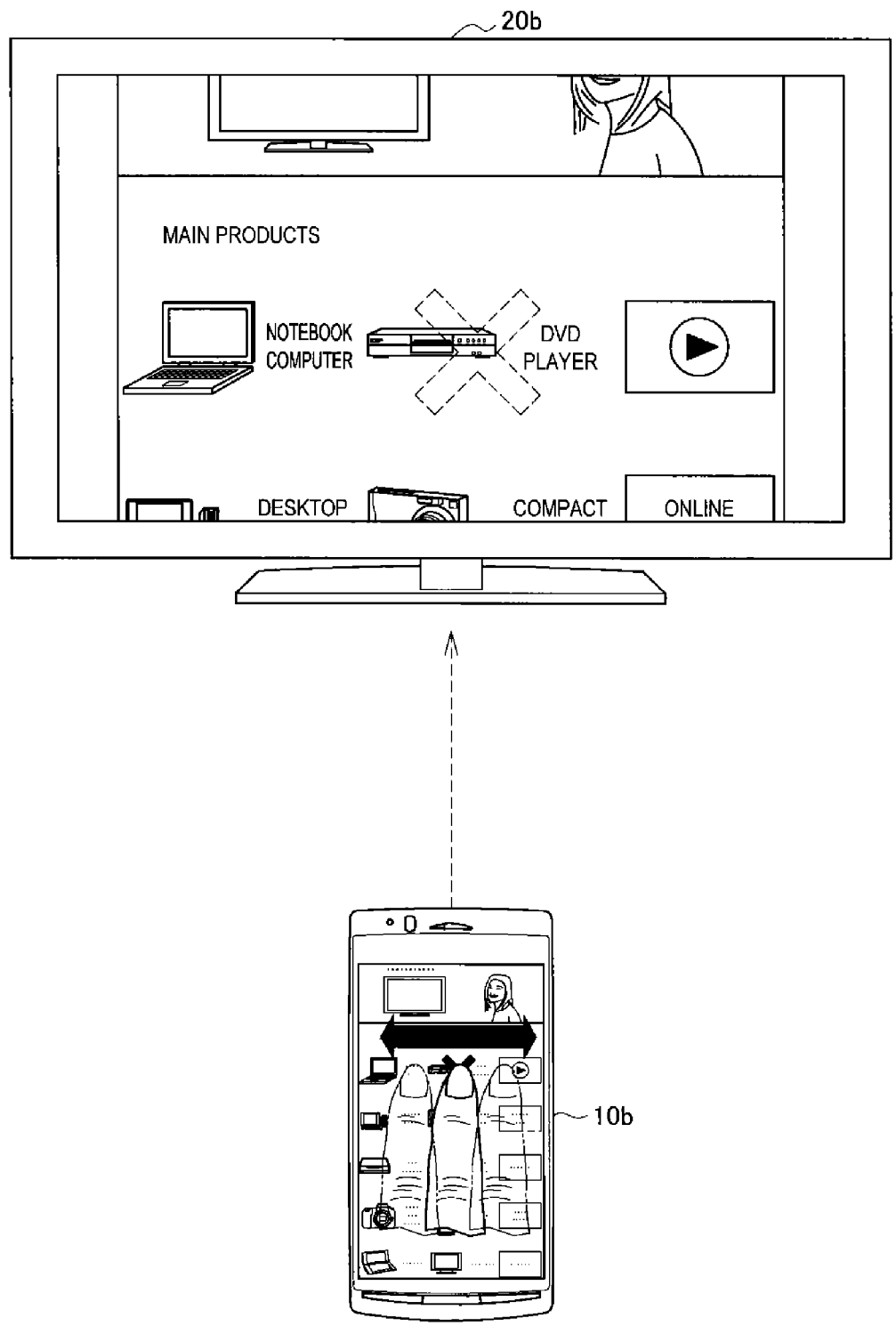
FIG. 15 is a diagram illustrating an operation when the transmitting device according to the second embodiment transmits an erasure command.

Next, a content sharing system according to a second embodiment of the present disclosure will be described with reference to FIGS. 14 and 15. FIG. 14 is a block diagram illustrating a functional configuration of a transmitting device according to the second embodiment of the present disclosure. FIG. 15 is a diagram illustrating an operation when the transmitting device according to the second embodiment transmits an erasure command.

First, referring to FIG. 14, a transmitting device 10b according to the second embodiment of the present disclosure mainly includes a communication unit 105, a content storage unit 110, an output unit 115, an operation information acquiring unit 120, a point of interest information generating unit 125, and an update information generating unit 130.

In this case, because functions of the communication unit 105, the content storage unit 110, the output unit 115, the operation information acquiring unit 120, and the point of interest information generating unit 125 are the same as those of the first embodiment, repeated explanation thereof will be omitted.

(Update Information Generating Unit 130)

The update information generating unit 130 has a function of generating update information with respect to point of interest information generated by the point of interest information generating unit 125. The update information may be transmitted separately to the reproducing device 20, after the point of interest information is transmitted to the reproducing device 20. A user of the transmission side may transmit the update information at timing at which the user desires to perform update and the reproducing device 20 may update the point of interest information at timing at which the update information is received. The update information may be transmitted to the reproducing device 20 at the same time as the point of interest information. For example, when the update information transmitted at the same time as the point of interest information includes information showing a message that the point of interest information is updated after a predetermined time passes, the reproducing device 20 may update the point of interest information after the predetermined time passes, according to the update information.

If the transmitting device 10b transmits the update information to the reproducing device 20, the reproducing device 20 can update a reproduction state of the point of interest information according to the update information. Therefore, the point of interest information that is transmitted once according to the intention of the transmission side can be updated. For example, the point of interest information may be erased by the update information. Alternatively, the exterior of the point of interest such as a displayed shape or color may be changed by the update information.

For example, as illustrated in FIG. 15, when a user of the transmitting device 10b performs an operation for rubbing the mark M displayed at the position of the point of interest on the display screen (image to be erased by an erasure), the update information generating unit 130 of the transmitting device 10b can generate update information indicating an erasure instruction of the point of interest shown by the mark M.

In this embodiment, because the functional configuration of the reproducing device 20 is the same as the functional configuration of the first embodiment illustrated in FIG. 9, repeated explanation thereof will be omitted. The reproducing unit 210 can reproduce the point of interest information, according to the update information received by the communication unit 205.

4. Third Embodiment

Figure 16:
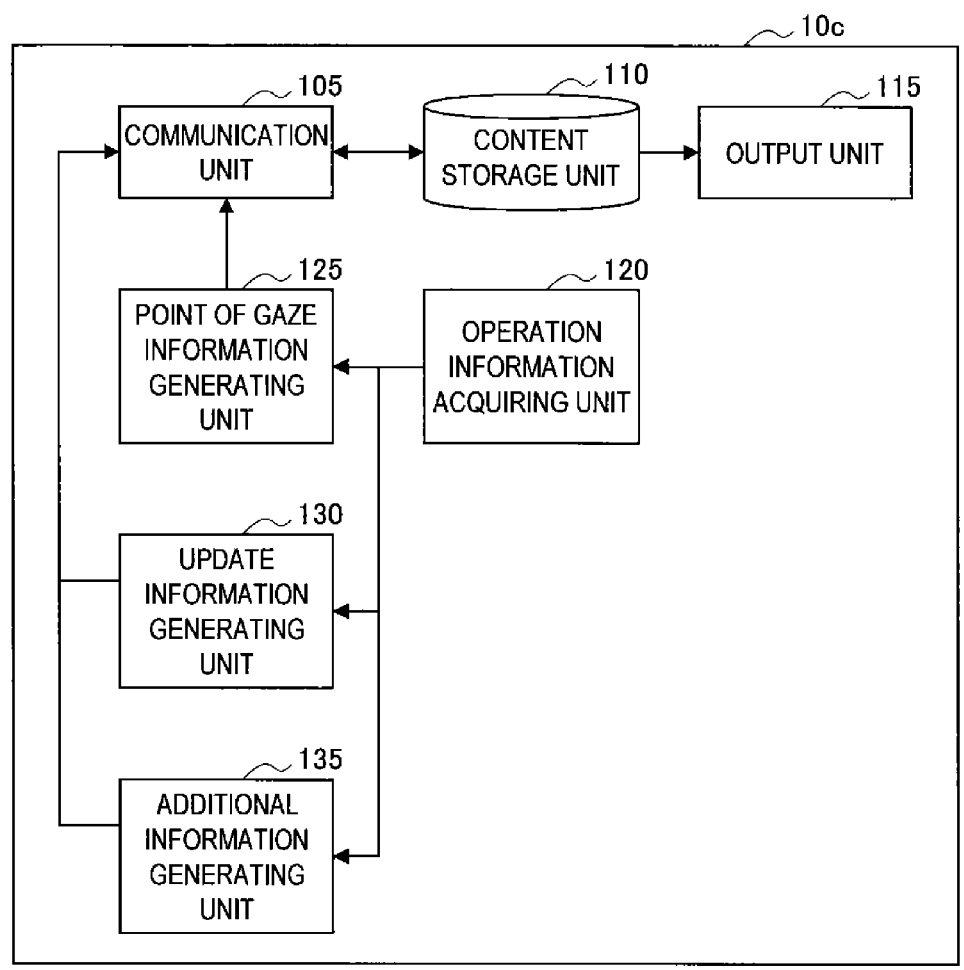
FIG. 16 is a block diagram illustrating a functional configuration of a transmitting device according to a third embodiment of the present disclosure.

Next, a content sharing system according to a third embodiment of the present disclosure will be described with reference to FIGS. 16 and 17. FIG. 16 is a block diagram illustrating a functional configuration of a transmitting device according to the third embodiment of the present disclosure. FIG. 17 is a diagram illustrating an example of additional information that is transmitted by the transmitting device according to the third embodiment.

First, referring to FIG. 16, a transmitting device 10c according to the third embodiment of the present disclosure mainly includes a communication unit 105, a content storage unit 110, an output unit 115, an operation information acquiring unit 120, a point of interest information generating unit 125, an update information generating unit 130, and an additional information generating unit 135.

In this case, because functions of the communication unit 105, the content storage unit 110, the output unit 115, the operation information acquiring unit 120, the point of interest information generating unit 125, and the update information generating unit 130 are the same as those of the first embodiment or the second embodiment, repeated explanation thereof will be omitted.

(Additional Information Generating Unit 135)

The additional information generating unit 135 has a function of generating additional information with respect to the content. The additional information generating unit 135 can transmit the generated additional information to the communication unit 105. For example, the additional information may be a memo with respect to the point of interest. For example, as illustrated in FIG. 17, the transmitting device 10c can transmit a memo command as the additional information to the reproducing device 20c. A reproducing unit 210 of the reproducing device 20c can display the memo at the position of the point of interest, according to the received memo command. At this time, an example of the memo command is as follows.

"memo={text: 'gain',size:'10',fontcolor:'black',bgcolor: 'orange',poi_id:'123'}"

In this case, the size shows a font size of the memo, the fontcolor shows a character color of the memo, the bgcolor shows a background color of the memo, and the poi_id shows an ID to identify a point of interest provided with the memo.

In this embodiment, because the functional configuration of the reproducing device 20 is the same as the functional configuration of the first embodiment illustrated in FIG. 9, repeated explanation thereof will be omitted. The reproducing unit 210 can reproduce the point of interest information, together with the additional information received by the communication unit 205.

5. Fourth Embodiment

Figure 18:
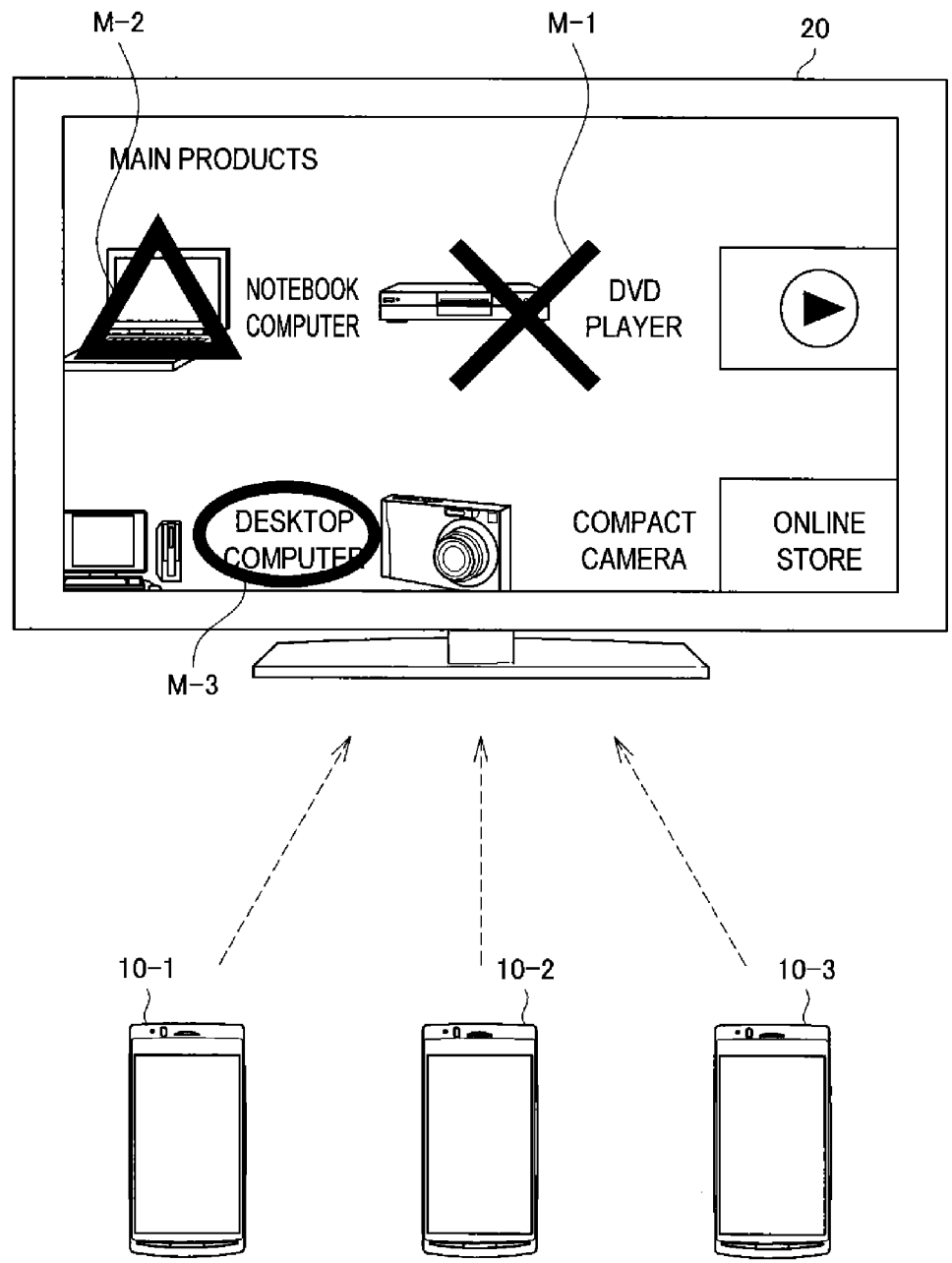
FIG. 18 is a diagram illustrating an outline of a content sharing system according to a fourth embodiment of the present disclosure.
Figure 19:
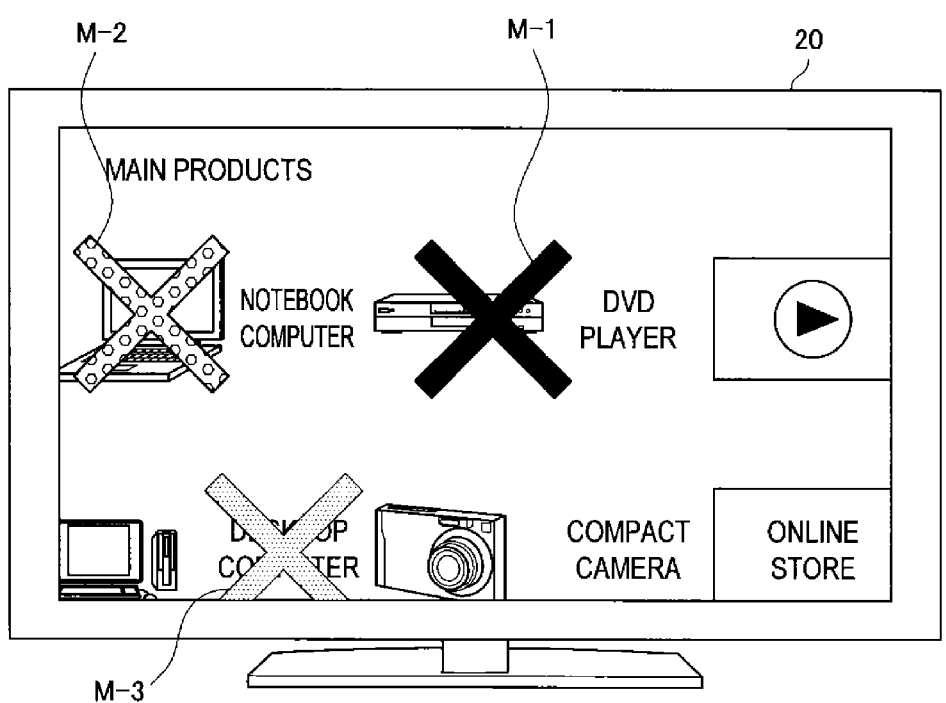
FIG. 19 is a diagram illustrating an example of point of interest information that is displayed by a reproducing device according to the fourth embodiment.
Figure 20:
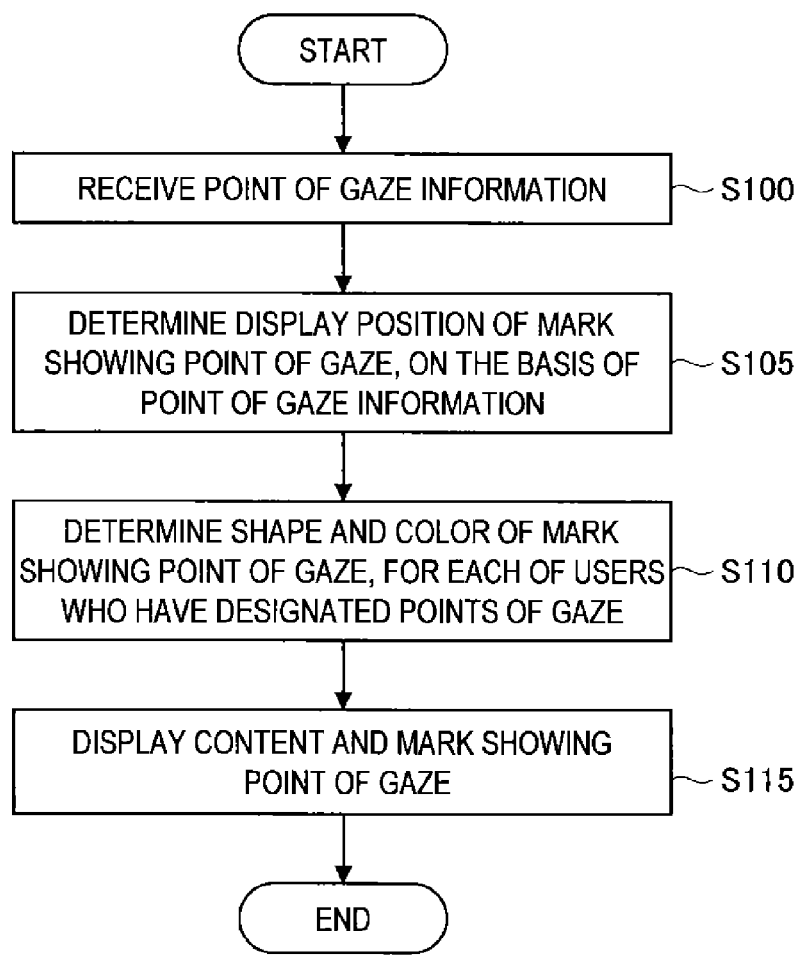
FIG. 20 is a flowchart illustrating an example of an operation of the reproducing device according to the fourth embodiment.

Next, a content sharing system according to a fourth embodiment of the present disclosure will be described with reference to FIGS. 18 and 20. FIG. 18 is a diagram illustrating an outline of the content sharing system according to the fourth embodiment of the present disclosure. FIG. 19 is a diagram illustrating an example of point of interest information that is displayed by a reproducing device according to the fourth embodiment. FIG. 20 is a flowchart illustrating an example of an operation of the reproducing device according to the fourth embodiment.

In the fourth embodiment, sharing of a point of interest when it is assumed that a plurality of users shares a piece of content with each other is considered. Referring to FIG. 18, the reproducing device 20 can receive point of interest information from a plurality of transmitting devices 10. The reproducing device 20 may display the received point of interest information with an expression different for each user. By this configuration, each of the users who view the content to be shared can determine the point of interest displayed by each user, on the basis of the exterior.

In addition, transmitting devices 10-1, 10-2, and 10-3 can share the same content and display the content. Users of the transmitting devices 10-1, 10-2, and 10-3 can designate points of interest while viewing a screen of the transmitting device 10.

With respect to an expression of the point of interest, the reproducing device 20 may select a mark M different for each user and use the mark. For example, the reproducing device 20 may display point of interest information transmitted from the transmitting device 10-1 by a cross mark M-1. If the reproducing device 20 receives the point of interest information, the reproducing device 20 can specify the user who has designated the point of interest information and select the mark M different for each user. The reproducing device 20 may display the point of interest information transmitted from the transmitting device 10-2 by a triangular mark M-2. The reproducing device 20 may display the point of interest information transmitted from the transmitting device 10-3 by a circular mark M-3.

The reproducing device 20 may select a mark M having a color different for each user and use the mark. For example, as illustrated in FIG. 19, the reproducing device 20 can display a mark M-1 showing a point of interest transmitted from the transmitting device 10-1, a mark M-2 showing a point of interest transmitted from the transmitting device 10-2, and a mark M-3 showing a point of interest transmitted from the transmitting device 10-3, with different colors, respectively.

Next, an example of an operation of the reproducing device 20 that receives the point of interest information from the plurality of transmitting devices 10 will be described with reference to FIG. 20. If the communication unit 205 of the reproducing device 20 receives the point of interest information (S100), the reproducing unit 210 determines a display position of the mark M showing the point of interest, on the basis of the point of interest information (S105).

Next, the reproducing unit 210 determines a shape and a color of the mark M showing the point of interest, for each of the users who have designated the points of interest (S110). The reproducing unit 210 causes the output unit 220 to display the content and the mark showing the point of interest.

In this case, the reproducing device 20 displays the point of interest with an expression different for each user. However, the reproducing device 20 may display the point of interest with an expression different for each transmitting device 10.

In the example described above, the reproducing device 20 is configured to determine the expression of the mark M. However, the present disclosure is not limited to the example described above. For example, at the side of the transmitting device 10, the user may select the expression of the mark M while viewing the shared screen. In this case, the reproducing device 20 can display the point of interest using the mark designated in the transmitting device 10.

The example of the functions of the transmitting device 10 and the reproducing device 20 according to this embodiment has been described. However, the structural elements may be configured using general-purpose members or circuits and may be configured using hardware specialized to the functions of the structural elements. The functions of the structural elements may be realized by reading a control program from a storage medium such as a read only memory (ROM) or a random access memory (RAM) storing the control program describing a processing sequence to realize the functions by an arithmetic device such as a central processing unit (CPU) and analyzing and executing the control program. Therefore, the used configuration can be appropriately changed according to a technical level when this embodiment is carried out.

A computer program that realizes the functions of the transmitting device 10 and the reproducing device 20 according to this embodiment can be generated and can be mounted on a personal computer. A computer readable recording medium that stores the computer program can be provided. For example, the recording medium may be a magnetic disk, an optical disk, a magneto optical disk, or a flash memory. The computer program may be distributed through the network without using the recording medium.

It should be understood by those skilled in the art that various modifications, combinations, sub-combinations and alterations may occur depending on design requirements and other factors insofar as they are within the scope of the appended claims or the equivalents thereof.

For example, in the embodiments described above, the mobile phone and the television receiver have been exemplified. However, the present disclosure is not limited thereto. The present disclosure is applicable to all information processing apparatuses that have an environment in which content can be shared.

Additionally, the following configurations are also within the technical scope of the present disclosure.

(1) An apparatus including:

a transmitter configured to transmit content and a point of interest indicator to a second device, the content and the point of interest indicator being selected by a user of the first device using a single action, the point of interest indicator identifying a portion of the content to be highlighted by the second device.

(2) The apparatus according to (1), further comprising:

an interface configured to receive a selection of the content and the point of interest indicator by a single action of the user which is a flick operation, the first device setting the point of interest indicator based on a portion of the content touched by the user during the flick operation.

(3) The apparatus according to (2), wherein the interface includes a touch screen.

(4) The apparatus according to (1), further comprising:

an interface configured to receive a selection of the content and the point of interest indicator by a single action of the user which is a touch operation, the first device setting the point of interest indicator based on a portion of the content touched by the user during the touch operation.

(5) The apparatus according to (4), wherein the interface includes a touch screen.

(6) The apparatus according to (1), further comprising:

an interface configured to detect a direction of a face of a user, the interface selecting the content and the point of interest indicator based on the direction.

(7) The apparatus according to (1) to (6), wherein the apparatus is a mobile phone.

(8) The apparatus according to (7), wherein the second device is a personal computer.

(9) The apparatus according to (1) to (8), wherein the transmitter transmits additional information to the second device, the additional information including text information.

(10) The apparatus according to (1) to (9), wherein the second device displays a mark representing the point of interest indicator on a display of the content.

(11) The apparatus according to (10), wherein the second device displays a first mark representing the point of interest indicator on the display of the content when the point of interest indicator includes an exact location and the second device displays a second mark representing the point of interest indicator on the display of the content when the point of interest indicator includes an approximate location.

(12) The apparatus according to (1) to (11), wherein the second device receives a point of interest indicator from a plurality of devices with respect to a same content.

(13) The apparatus according to (12), wherein the second device displays a different mark for each point of interest indicator from the plurality of devices on a display of the content.

(14) The apparatus according to (1) to (13), wherein the second device controls a display region to include a mark representing the point of interest indicator on a display of the content.

(15) The apparatus according to (1) to (14), wherein the second device updates a mark representing the point of interest indicator on a display of the content.

(16) The apparatus according to (15), wherein the transmitter sends an updated point of interest indicator that indicates that the mark should be erased, and the second device deletes the mark representing the point of interest indicator on the display of the content after receiving the updated point of interest indicator.

(17) A system comprising the apparatus according to (1) to (16); and the second device configured to receive the content and the point of interest indicator from the apparatus and to reproduce the content with an indicator highlighting the portion of the content identified by the point of interest indicator.

(18) A method performed by the apparatus according to (1) to (16), the method including:

transmitting the content and the point of interest indicator to the second device.

(19) A non-transitory computer readable medium encoded with a program that, when loaded on a processor in the apparatus according to (1) to (16), causes the apparatus to perform a method including:

transmitting the content and the point of interest indicator to the second device.

(20) An apparatus including:

a receiver configured to receive content and a point of interest indicator from another apparatus; and a display configured to reproduce the content with an indicator highlighting the portion of the content identified by the point of interest indicator.

(21) The apparatus according to (20), wherein the display displays a mark representing the point of interest indicator superimposed on the display of the content.

(22) The apparatus according to claim 21, wherein the display displays a first mark representing the point of interest indicator on the display of the content when the point of interest indicator includes an exact location and the display displays a second mark representing the point of interest indicator on the display of the content when the point of interest indicator includes an approximate location.

(23) The apparatus according to claim 21, wherein the receiver receives a point of interest indicator from a plurality of devices with respect to a same content.

(24) The apparatus according to (23), wherein the display displays a different mark for each point of interest indicator from the plurality of devices on a display of the content.

(24) The apparatus according to (21), wherein the display controls a display region to include the indicator representing the point of interest indicator on a display of the content.

(25) The apparatus according to (24), wherein the display controls the display region such that the mark is approximately at a center of the display region.

(26) The apparatus according to (24), wherein the display updates the mark representing the point of interest indicator on a display of the content.

REFERENCE SIGNS LIST

10 Transmitting device
105 Communication unit
110 Content storage unit
115 Output unit
120 Operation information acquiring unit
125 Point of interest information generating unit
130 Update information generating unit
135 Additional information generating unit
20 Reproducing device
205 Communication unit
210 Reproducing unit
215 Operation information acquiring unit
220 Output unit

The invention claimed is:

1. An apparatus comprising:

circuitry configured to generate a point of interest position associated with content based on a user input, the point of interest position identifying a portion of the content to be highlighted by another apparatus when the content is reproduced by the another apparatus; and a transmitter configured to transmit the content and a point of interest control command separately to the another apparatus, the point of interest control command includes the point of interest position and information indicating a type of the content.

2. The apparatus according to claim 1, further comprising:
an interface configured to receive a selection of the content and the point of interest position by a single action of a user which is a flick operation.

3. The apparatus according to claim 2, wherein the circuitry is configured to set the point of interest position based on a portion of the content touched by the user during the flick operation.

4. The apparatus according to claim 1, further comprising:
an interface configured to receive a selection of the content and the point of interest position by a single action of a user which is a touch operation, the circuitry being configured to set the point of interest position based on a portion of the content touched by the user during the touch operation.

5. The apparatus according to claim 1, further comprising:
an interface configured to detect a direction of a face of a user, the interface selecting the content and the point of interest position based on the direction.

6. The apparatus according to claim 1, wherein the transmitter transmits additional information to the another apparatus.

7. The apparatus according to claim 1, wherein the information indicating a type of the content indicates whether the content with which the point of interest position associated is a still image, a video, or a string.

8. The apparatus according to claim 1, wherein the transmitter sends updated point of interest information that indicates that the portion of the content identified based on the point of interest position is no longer subject to be highlighted by the another apparatus when the content is reproduced by the another apparatus.

9. A system comprising:
a first apparatus, comprising
circuitry configured to generate a point of interest position associated with content based on a user input, the point of interest position identifying a portion of the content to be highlighted by a second apparatus when the content is reproduced by the second apparatus; and
a transmitter configured to transmit the content and a point of interest control command separately to the second apparatus, the point of interest control command includes the point of interest position and information indicating a type of the content; and
the second apparatus configured to
receive the content and the point of interest control command from the first apparatus;
reproduce the content on a display of the second apparatus; and
display an indicator on the display, the indicator highlighting the portion of the content identified according to the point of interest position.

10. A method performed by an apparatus, the method comprising:
generating, by circuitry of the apparatus, a point of interest position associated with content based on a user input, the point of interest position identifying a portion of the content to be highlighted by another apparatus when the content is reproduced by the another apparatus; and transmitting, by a transmitter of the apparatus, the content and a point of interest control command separately to the another apparatus, the point of interest control command includes the point of interest position and information indicating a type of the content.

11. A non-transitory computer readable medium encoded with a program that, when executed by at least one processor, causes an apparatus to perform a method comprising:
generating a point of interest position associated with content based on a user input, the point of interest position identifying a portion of the content to be highlighted by another apparatus when the content is reproduced by the another apparatus; and
transmitting the content and a point of interest control command separately to the another apparatus, the point of interest control command includes the point of interest position and information indicating a type of the content.

12. An apparatus comprising:
a receiver configured to receive content and a point of interest control command separately from another apparatus, the point of interest control command includes a point of interest position associated with the content and information indicating a type of the content, the point of interest position identifying a portion of the content to be highlighted by the apparatus when the content is reproduced by the apparatus;
a display; and
circuitry configured to
reproduce the content on the display; and
cause the display to highlight the portion of the content identified according to the point of interest position.

13. The apparatus according to claim 12, wherein the circuitry is configured to cause the display to display a mark that highlights the portion of the content identified according to the point of interest position on the reproduced content.

14. The apparatus according to claim 13, wherein the circuitry is configured to superimpose the mark on the reproduced content.

15. The apparatus according to claim 12, wherein the circuitry is configured to cause the display to display a first mark that highlights the portion of the content identified according to the point of interest position on the reproduced content when the point of interest position corresponds to an exact location and to display a second mark that highlights the portion of the content identified according to the point of interest position on the reproduced content when the point of interest position corresponds to an approximate location.

16. The apparatus according to claim 12, wherein the receiver is configured to receive a plurality of point of interest positions from a plurality of devices with respect to a same content.

17. The apparatus according to claim 16, wherein the circuitry is configured to cause the display to display a different mark for each point of interest position from the plurality of devices on the reproduced content.

18. The apparatus according to claim 12, wherein the circuitry is configured to control a display region of the reproduced content to include the portion of the content identified according to the point of interest position.

19. The apparatus according to claim 18, wherein the circuitry is configured to control the display region such that a mark that highlights the portion of the content identified according to the point of interest position is approximately at a center of the display region.

20. The apparatus according to claim 18, wherein the circuitry is configured to cause the display to update a mark that highlights the portion of the content identified according to the point of interest position.

\* \* \* \* \*